United States Patent
Volynets

(10) Patent No.: US 12,277,481 B2
(45) Date of Patent: Apr. 15, 2025

(54) METHOD OF AND SYSTEM FOR GENERATING A TRAINING SET FOR A MACHINE LEARNING ALGORITHM (MLA)

(71) Applicant: YANDEX EUROPE AG, Lucerne (CH)

(72) Inventor: Eduard Mechislavovich Volynets, Minsk (BY)

(73) Assignee: Y.E. Hub Armenia LLC, Yerevan (AM)

( * ) Notice: Subject to any disclaimer, the term of this patent is extended or adjusted under 35 U.S.C. 154(b) by 1069 days.

(21) Appl. No.: 17/123,749

(22) Filed: Dec. 16, 2020

(65) Prior Publication Data

US 2021/0374606 A1 Dec. 2, 2021

(30) Foreign Application Priority Data

Jun. 1, 2020 (RU) .......................... RU2020117960

(51) Int. Cl.
 *G06N 20/00* (2019.01)
 *G06F 16/953* (2019.01)
 *G06N 5/04* (2023.01)

(52) U.S. Cl.
 CPC .......... *G06N 20/00* (2019.01); *G06F 16/953* (2019.01); *G06N 5/04* (2013.01)

(58) Field of Classification Search
 None
 See application file for complete search history.

(56) References Cited

U.S. PATENT DOCUMENTS

| 8,515,975 B1 | 8/2013 | Federici |
| 9,092,483 B2 | 7/2015 | Brockett et al. |
| 9,104,733 B2 | 8/2015 | Gao et al. |

(Continued)

FOREIGN PATENT DOCUMENTS

| CN | 108460396 A | 8/2018 |
| CN | 104715063 B | 11/2018 |

(Continued)

OTHER PUBLICATIONS

Office Action issued on Mar. 17, 2023 in respect of the related U.S. Appl. No. 17/123,764.
Notice of Allowance dated May 5, 2023 received in respect of a related U.S. Appl. No. 17/123,764.
Wang et al., "Improved Retrieval Accuracy for Difficult Queries using Negative Feedback", published in 2007 at the Conference on Information and Knowledge Management (CIKM), 4 pages.

(Continued)

*Primary Examiner* — Alan Chen
(74) *Attorney, Agent, or Firm* — BCF LLP

(57) ABSTRACT

There is disclosed a method and system for generating a training set for training a machine learning algorithm (MLA) implemented in an information retrieval system. The method is executable by the server and comprises: retrieving, from a search log database of the server, a first query previously submitted to the server, a first SERP associated with the first query, a second query different from the first query and submitted after the first query, and a second SERP associated with the second query, the first query and the second query having been submitted by the electronic device: the first SERP including a first set of search results; and the second SERP including a second set of search results; in response to the second query being submitted within a same search session as the first query, generating the training set to be used as negative training examples for training the MLA.

20 Claims, 5 Drawing Sheets

(56) References Cited

U.S. PATENT DOCUMENTS

| | | |
|---|---|---|
| 9,256,680 B2 | 2/2016 | Kumaran |
| 9,268,824 B1 | 2/2016 | Federici |
| 10,275,406 B2 | 4/2019 | Nikulin |
| 10,353,974 B2 | 7/2019 | Kuralenok |
| 10,810,193 B1 | 10/2020 | Subramanya et al. |
| 2009/0193007 A1 | 7/2009 | Mastalli et al. |
| 2011/0093459 A1 | 4/2011 | Dong et al. |
| 2012/0150836 A1 | 6/2012 | He et al. |
| 2013/0013596 A1 | 1/2013 | Wang et al. |
| 2013/0086024 A1 | 4/2013 | Liu et al. |
| 2013/0246412 A1* | 9/2013 | Shokouhi ............ G06F 16/9538 707/E17.084 |
| 2015/0012524 A1 | 1/2015 | Heymans et al. |
| 2016/0042296 A1 | 2/2016 | Shan et al. |
| 2016/0299899 A1 | 10/2016 | Logachev |
| 2017/0220575 A1 | 8/2017 | Hohwald et al. |
| 2017/0300828 A1 | 10/2017 | Feng et al. |
| 2018/0293242 A1 | 10/2018 | Shishkin et al. |
| 2019/0332946 A1 | 10/2019 | Han et al. |

FOREIGN PATENT DOCUMENTS

| | | |
|---|---|---|
| CN | 109857845 A | 6/2019 |
| RU | 2580516 C2 | 4/2016 |
| RU | 2677380 C2 | 1/2019 |

OTHER PUBLICATIONS

English Abstract for CN109857845 retrieved on Espacenet on Dec. 15, 2020.
English Abstract for CN108460396 retrieved on Espacenet on Dec. 15, 2020.
English Abstract for CN104715063 retrieved on Espacenet on Dec. 15, 2020.
Russian Search Report dated Jun. 30, 2022 issued in respect of the related Russian Patent Application No. RU 2020117965.
Notice of Allowance dated Jul. 20, 2023 received in respect of a related U.S. Appl. No. 17/123,764.
Russian Search Report dated Jun. 21, 2022 issued in respect of the counterpart Russian Patent Application No. RU 2020117960.

* cited by examiner

| Query | Time Stamp | SERP | User Int. Parameter |
|---|---|---|---|
| 103 Rejection | 2020-04-09 13:06 | SERP1 | None |
| 103 Rejection USPTO | 2020-04-09 13:07 | SERP2 | Clicked but returned to SERP |
| 103 Rejection USPTO overcome | 2020-04-09 13:07 | SERP3 | Clicked |
| Pizza Montreal | 2020-04-09 13:09 | SERP4 | None |
| Pizza Montreal take out | 2020-04-09 13:10 | SERP | Clicked |

FIGURE 2

METHOD OF AND SYSTEM FOR GENERATING A TRAINING SET FOR A MACHINE LEARNING ALGORITHM (MLA)

CROSS-REFERENCE

The present application claims priority to Russian Patent Application No. 2020117960, entitled "METHOD OF AND SYSTEM FOR GENERATING A TRAINING SET FOR A MACHINE LEARNING ALGORITHM (MLA)", filed on Jun. 1, 2020, the entirety of which is incorporated herein by reference.

FIELD

The present technology relates to machine learning algorithms in general and, more specifically, to a method of and a system for generating a training set for a machine learning algorithm.

BACKGROUND

Machine learning algorithms (MLAs) are used to address multiple needs in computer-implemented technologies. Typically, the MLAs are used for generating a prediction associated with a user interaction with a computer device. One example of an area where such prediction is required is user interaction with the content available on the Internet (as an example).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

When the user submits a search query, the search engine generates a list of relevant web resources (based on an analysis of crawled web resources, an indication of which is stored in a crawler database in a form of posting lists or the like). The search engine then executes the MLA to rank the so-generated list of search results. The MLA ranks the list of search results based on their relevancy to the search query. Such MLA is "trained" to predict relevancy of the given search result to the search query based on a plethora of "features" associated with the given search result, as well as indications of past users' interactions with search results when submitting similar search queries in the past.

In order to use the MLA to predict relevance of search results to a given user-submitted query, the MLA needs to be "trained". Depending on the implementation of the MLA, training can be implemented differently, such as supervised training, unsupervised training, etc. In a typical training approach, though, the MLA is presented with a number of training examples—labelled training sets that are used to "teach" the MLA to draw conclusions on the task at hand (such as predicting relevance of documents to the search query). Typically, the MLA is presented with "positive" examples (in this example, documents that are relevant) and "negative" examples (in this example, documents that are not relevant).

United Stated Patent Publication No. 2017/220575 A1 to Shutterstock Inc. on Jul. 3, 2017, and titled "Identification of Synthetic Examples for Improving Search Ranking" discloses methods, systems and machine-readable media for identifying synthetic media file examples to train a supervised machine learned ranking algorithm to rank relevance of media files to a search query. In one aspect, a method includes identifying a search query for a search engine for a collection of media files from previously received search queries, and selecting at least one training media file from the collection as a synthetic negative example for the search query. The method also includes providing a training set to a supervised machine learned ranking algorithm. The training set includes an identification of the search query, a copy of the training media file, and a first indicator that the training media file is a synthetic negative example for the search query. The method further includes providing, to the algorithm, the search query and the collection, and receiving, from the algorithm, a ranking of the collection.

The article authored by Xuanhui Wang et al., published in 2007 at the Conference on Information and Knowledge Management (CIKM) and titled "Improved Retrieval Accuracy for Difficult Queries using Negative Feedback" considers a situation where the search results are so poor that none of the top-ranked documents is relevant to a user's query, and propose to exploit negative feedback to improve retrieval accuracy for such difficult queries.

SUMMARY

Developers of the present technology have appreciated at least one technical problem associated with the prior art approaches.

The present technology relates to machine learning algorithms in general, and more specifically, to methods and systems for generating a training set for a machine learning algorithm. As has been alluded to above, when training various supervised learning based Machine Learning Algorithms (MLAs)—be it decision tree based MLA, or Neural Networks (NN)—the MLA is fed with "training sets". Training sets are marked examples illustrating both positive examples and negative examples. The positive examples teach the MLA what a particular target "is" and the negative examples teach the MLA what the particular target "is not".

Generally speaking, the positive examples are easy to generate. For example, for search queries and documents pairs, the examples can be "mined" using query logs of a search engine server, with users clicks (or another indication of the user interaction) being a good indication of relevancy of the given past document to the given past user query. The negative examples may be more difficult to generate.

A typical MLA training system uses "random" negative examples with a "hope" that the most random examples will be radically different form the positive examples and, thus, will serve well as negative examples. However, in reality, the "effectiveness" of negative examples is not 100% (closer to a 80% mark).

In accordance with a first broad aspect of the present technology, there is disclosed a computer-implemented method for generating a training set for training a machine learning algorithm (MLA) implemented in an information retrieval system, the MLA executable by a server, the server being configured to be accessed by an electronic device, the method executable by the server, the method comprising: retrieving, from a search log database of the server, a first query previously submitted to the server, a first search engine result page (SERP) associated with the first query, a second query different from the first query and submitted after the first query, and a second SERP associated with the second query, the first query and the second query having been submitted by the electronic device: the first SERP including a first set of search results; and the second SERP including a second set of search results; in response to the second query being submitted within a same search session as the first query, generating the training set to be used as negative training examples for training the MLA, the training set comprising the second query paired with a pre-determined search result included within the first set of search results.

In some non-limiting embodiments of the method, the method further comprises, prior to generating the training set, checking if the first query and the second query to have been submitted to the server by the electronic device within the same search session.

In some non-limiting embodiments of the method, determining the first query and the second query to have been submitted within the same search session comprises analyzing a time difference between a first time at which the first query has been submitted and a second time at which the second query has been submitted.

In some non-limiting embodiments of the method, in response to the time difference being below a pre-determined time threshold, determining the first query and the second query to have been submitted within the same search session.

In some non-limiting embodiments of the method, determining the first query and the second query to have been submitted within the same search further comprises analyzing the first query and the second query.

In some non-limiting embodiments of the method, the method further comprises analyzing the first query and the second query to identify an overlap between the first query and the second query, and wherein the generating the training set is only executed in response to determining the overlap.

In some non-limiting embodiments of the method, the overlap is identified in response to presence of at least one common search term between the first query and the second query.

In some non-limiting embodiments of the method, the overlap is identified in response to presence of at least one common search term between the first query and the second query.

In some non-limiting embodiments of the method, the overlap is identified in response to presence of a single common search term between the first query and the second query.

In some non-limiting embodiments of the method, the method further comprises retrieving, from the search log database of the server, a set of user interaction parameter being indicative of one or more type of interaction executed by a user of the electronic device with the second SERP for a given search result included within the second set of search results, the set of user interaction parameter comprising at least one of: a hovering time for the given search result; a click event for the given search result.

In some non-limiting embodiments of the method, the method further comprises selecting a search result included within the second set of search results having a highest user interaction parameter; selecting the pre-determined search result based on a position of the search result within the second SERP.

In some non-limiting embodiments of the method, the pre-determined search result corresponds to at least one of: a first given search result having a same position within the first SERP as the search result within the second SERP; a second given search result having a position above or below the position of the search result within the first SERP.

In some non-limiting embodiments of the method, the method further comprises randomly selecting the pre-determined search result as one of the first given search result having the same position within the first SERP as the search result within the second SERP or the second given search result having the position above or below the position of the search result within the first SERP.

In some non-limiting embodiments of the method, the method further comprises analyzing user interaction with the pre-determined search result, and wherein the generating the training set is only executed in response to the user interaction with the pre-determined search result being below a pre-determined interaction threshold.

In some non-limiting embodiments of the method, the pre-determined interaction threshold is thirty seconds.

In some non-limiting embodiments of the method, the search session comprises a plurality of SERPs generated in response to a plurality of queries, the plurality of SERPs including the first SERP and the second SERP and the plurality of queries including the first query and the second query, and wherein the second SERP is a last SERP of the plurality of SERPs.

In some non-limiting embodiments of the method, the first SERP is an immediately preceding SERP for the second SERP within the plurality of SERPs.

In accordance with another broad aspect of the present technology, there is disclosed a system for generating a training set for training a machine learning algorithm (MLA) executable by a server, the server being accessible by an electronic device, the server comprising a processor configured to: retrieve, from a search log database of the server, a first query previously submitted to the server, a first search engine result page (SERP) associated with the first query, a second query different from the first query and submitted after the first query, and a second SERP associated with the second query, the first query and the second query having been submitted by the electronic device: the first SERP including a first set of search results; and the second SERP including a second set of search results; in response to the second query being submitted within a same search session as the first query, generate the training set to be used as negative training examples for training the MLA, the training set comprising the second query paired with a predetermined search result included within the first set of search results.

In some non-limiting embodiments of the system, prior to generating the training set, the processor is configured to check if the first query and the second query have been submitted to the server by the electronic device within the same search session.

In some non-limiting embodiments of the system, to determine the first query and the second query to have been submitted within the same search session, the processor is configured to analyze a time difference between a first time at which the first query has been submitted and a second time at which the second query has been submitted.

In some non-limiting embodiments of the system, in response to the time difference being below a pre-determined time threshold, the processor is configured to determine the first query and the second query to have been submitted within the same search session.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other locations where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2 depicts a schematic illustration of a query log associated with the electronic device of the system of FIG. 1.

DETAILED DESCRIPTION

Figure 1:
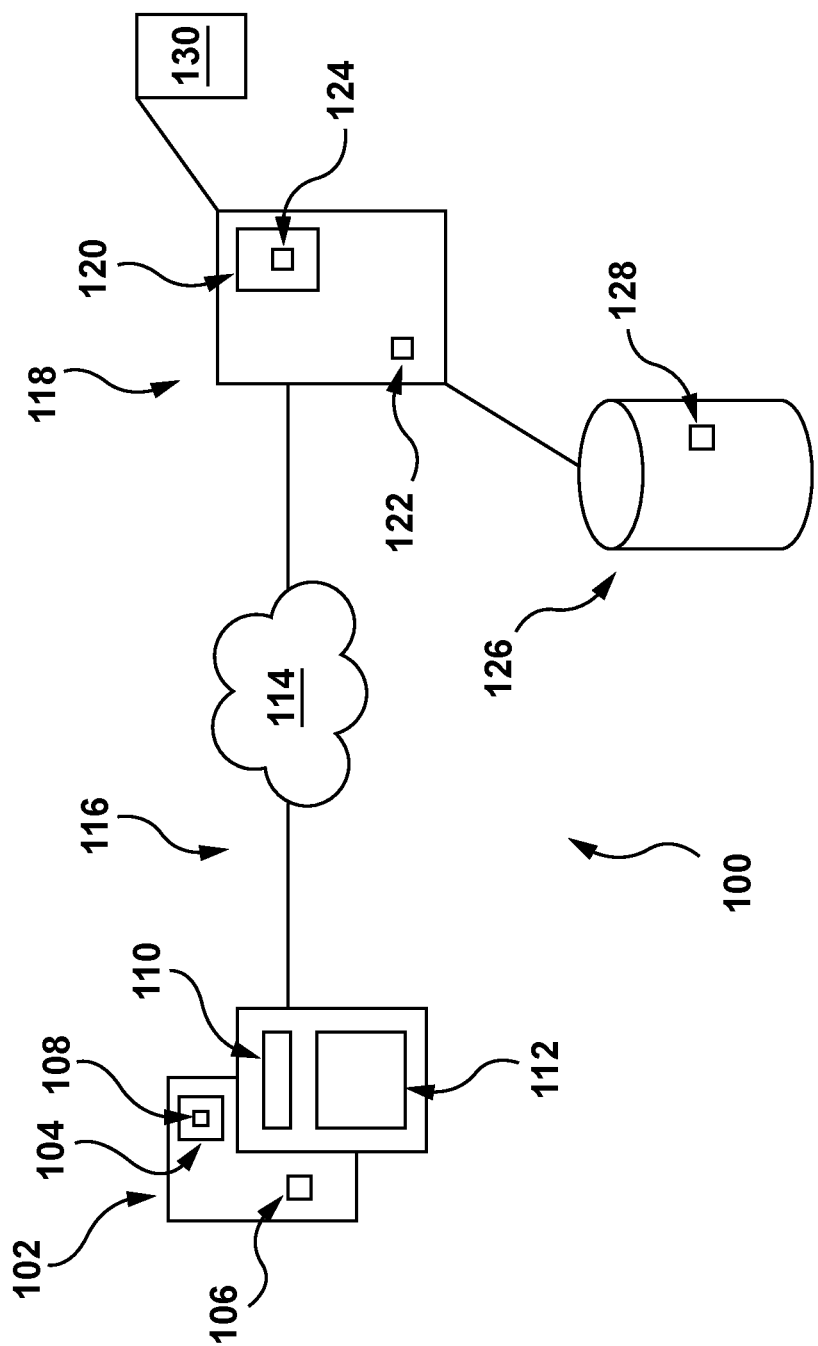
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, the system 100 is an information retrieval system and comprises an electronic device 102. The electronic device 102 is typically associated with a user (not depicted) and, as such, can sometimes be referred to as a "client device".

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art, to execute a search engine application 108. Generally speaking, the purpose of the search engine application 108 is to enable the user (not shown) to execute a search, such as a web search using a search engine service hosted on a server (described below). To that end, the search engine application 108 comprises a search query interface 110 and a search results interface 112.

How the search engine application 108 is implemented is not particularly limited. One example of the search engine application 108 may be embodied in the user (not shown) accessing a web site associated with a search engine to access the search engine application 108. For example, the search engine application 108 can be accessed by typing in a uniform resource locator (URL) associated with Yandex™ search engine at www.yandex.ru. It should be expressly understood that the search engine application 108 can be accessed using any other commercially available or proprietary search engine.

In alternative non-limiting embodiments of the present technology, the search engine application 108 may be implemented as a browser application on a portable device (such as a wireless communication device). For example, where the electronic device 102 is implemented as a portable device, such as for example, Samsung™ Galaxy™ S10, the electronic device 102 may be executing a Yandex™ browser application. It should be expressly understood that any other commercially available or proprietary browser application can be used for implementing non-limiting embodiments of the present technology.

Generally speaking, the electronic device 102 comprises a user input interface (not shown) (such as a keyboard) for receiving user inputs into, for example, the query interface 110. How the user input interface is implemented is not particularly limited and will depend on how the electronic device 102 is implemented. Merely as an example and not as a limitation, in those embodiments of the present technology where the electronic device 102 is implemented as a wireless communication device (such as an iPhone™ smart phone), the user input interface can be implemented as a soft keyboard (also called an on-screen keyboard or software keyboard). On the other hand, where the electronic device 102 is implemented as a personal computer, the user input interface can be implemented as a hard keyboard.

The electronic device 102 is coupled to a communication network 114 via a communication link 116. In some non-limiting embodiments of the present technology, the communication network 114 can be implemented as the Internet. In other embodiments of the present technology, the communication network 114 can be implemented differently, such as any wide-area communications network, local-area communications network, a private communications network and the like.

How the communication link 116 is implemented is not particularly limited and will depend on how the electronic device 102 is implemented. Merely as an example and not as a limitation, in those embodiments of the present technology where the electronic device 102 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the electronic device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116 and the communication network 114. As such, by no means, examples provided hereinabove are meant to limit the scope of the present technology.

The system 100 further includes a server 118 coupled to the communication network 114. The server 118 can be implemented as a conventional computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The implementation of the server 118 is well known. However, briefly speaking, the server 118 comprises a communication interface (not depicted) structured and configured to communicate with various entities (such as the electronic device 102 and other devices potentially coupled to the communication network 114) via the communication network 114.

The server 118 comprises a server memory 120 having one or more storage media which generally provides a place to store computer-executable program instructions executable by a server processor 122. By way of example, the server memory 120 may be implemented as tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some non-limiting embodiments of the present technology, the server 118 can be operated by the same entity that has provided the afore-described search application 108. For example, the server 118 can be operated by Yandex LLC of Lev Tolstoy Street, No. 16, Moscow, 119021, Russia. In alternative embodiments, the server 118 can be operated by an entity different from the one providing the aforementioned search application 108.

In some embodiments of the present technology, the server 118 provides a search engine service 124 (such as Yandex Search™) which is accessible by the search application 108 via the communication network 114. The manner in which the search engine service 124 is implemented is known in the art and therefore will not be described in detail herein. Suffice to say that the search engine service 124 is configured to execute one or more web searches responsive to a "search string" entered by the user (not shown) into the query interface 110. The search engine service 124 is further configured to transmit to the electronic device 102 a set of search results, to be displayed to the user of the electronic device 102 via the search results interface 112, as a search engine result page (SERP).

The server 118 is configured to generate a ranked search results list, including the results from the general web search and the vertical web search. Multiple algorithms for ranking the search results are known and can be implemented by the server 118.

Just as an example and not as a limitation, some of the known techniques for ranking search results by relevancy to the user-submitted search query are based on some or all of: (i) how popular a given search query or a response thereto is in searches; (ii) how many results have been returned; (iii)

whether the search query contains any determinative terms (such as "images", "movies", "weather" or the like), (iv) how often a particular search query is typically used with determinative terms by other users; and (v) how often other users performing a similar search have selected a particular resource or a particular vertical search results when results were presented using the SERP. The server 118 can thus calculate and assign a relevance score (based on the different criteria listed above) to each search result obtained in response to a user-submitted search query and generate a SERP, where search results are ranked according to their respective relevance scores. In the present embodiment, the server 118 may execute a plurality of machine learning algorithms for ranking documents and/or generate features for ranking documents.

In some non-limiting embodiments of the present technology, the server 118 is communicatively coupled with a log database 126 via a dedicated link (not numbered). Generally, the log database 126 may maintain a query log 128.

The purpose of the query log 128 is to log searches that were made using the server 118. More specifically, the query log 128 maintains terms of search queries (i.e. the associated search words) and the associated search results. It is noted that the query log 128 can be maintained in an anonymized manner—i.e. search queries are not trackable to the users who have submitted the search query.

More specifically, the query log 128 may include a list of queries with their respective terms, with information about documents that were listed by the server 118 in response to a respective query, a timestamp, and may also contain a list of users identified by anonymous IDs and the respective documents they have clicked on after submitting a query. In some embodiments, the query log 128 may be updated every time a new search is performed on the server 118. In other embodiments, the query log 128 may be updated at predetermined times. In some embodiments, there may be a plurality of copies of the query log 128, each corresponding to the query log 128 at different points in time.

In some non-limiting embodiments of the present technology, the query log 128 further includes user interaction parameters indicative of the interaction, such as clicking of one or more documents in the SERP.

Non-limiting examples of user interaction parameters stored by the query log 128 include (but are not limited to):
  Loss/Win: was the search result clicked in response to the search query or not (click event).
  Dwell time: time a user spends on a search result before returning to the SERP or abandoning the search (due the fact that the user has found the information she is looking for, as an example).
  Hovering time: time a user hovers on a search result.
  Long/short click: was the user interaction with the search result long or short, compared to the user interaction with other documents on the SERP.

Naturally, the above list is non-exhaustive and may include other types of user interactions without departing from the scope of the present technology.

With reference to FIG. 2, there is depicted a schematic illustration of the query log 128 associated with the electronic device 102.

In the illustrated example of the query log 128 of the electronic device 102, it is shown that the electronic device 102 has submitted 5 queries (namely a first search query 202, a second search query 204, a third search query 206, a fourth search query 208 and a fifth search query 210). Each of the 5 queries is associated with a respective time stamp 212, a respective SERP 214 and a respective user interaction parameter 216. Needless to say, although the query log 128 of the electronic device 102 includes only 5 queries, it is not limited as such, and it is contemplated that the query log 128 includes more or fewer than 5 queries.

As illustrated, it is shown that the user associated with the electronic device 102 has executed several searches associated with two different search intents. More specifically, the user had two search intents—each associated search comprising one or more refinements. In the context of the present technology, the term "refinement" corresponds to a search query that overlaps, or shares at least one common search term with a preceding search query. More specifically, the refinements occurs when the user submits a first search request (typically, a broader search request) and is not satisfied with the search results presented in response thereto (for example, the search results are too broad and do not address the user's search intent). The user then submits a second search request having a narrower, more focused search terms aligning the search with the user's search intent.

For example, the fifth search query 210 ("pizza montreal takeout") is a refinement of the fourth search query 208 ("pizza montreal"). In another example, the third search query 206 ("103 rejection USPTO overcome") is a refinement of the immediately preceding second search query 204 ("103 rejection USPTO"), which is itself also a refinement of the immediately preceding first search query 202 ("103 rejection"). Generally speaking, the presence of refinement in a chain of search query is indicative that the search intent of the user was not properly addressed in the earlier queries, and the latest refinement has potentially provided user satisfaction in the results (i.e. the user abandoning the search once the search intent is satisfied).

Moreover, it is noted that right after having searched for the third search query 206 for how to overcome a 103-type rejection at the USPTO, the user has started a completely different type of query, namely where to do a take out of pizza in Montreal. This, in turn, may be indicative of the user having satisfied the search intent and now focusing on another search intent.

Returning to FIG. 1, also coupled to the server 118 via a dedicated link is a training server 130. The training server 130 can be implemented as a conventional computer server. In an example of an embodiment of the present technology, the training server 130 can be implemented as a Dell™ PowerEdge™ Server running the Microsoft™ Windows Server™ operating system. Needless to say, the training server 130 can be implemented in any other suitable hardware and/or software and/or firmware or a combination thereof. In the depicted non-limiting embodiment of present technology, the training server 130 is a single server. In alternative non-limiting embodiments of the present technology, the functionality of the training server 130 may be distributed and may be implemented via multiple servers. In the context of the present technology, the training server 130 may implement in part the methods and systems described herein. In some embodiments of the present technology, the training server 130 is under control and/or management of a search engine operator. Alternatively, the training server 130 can be under control and/or management of another service provider. Although the training server 130 is illustrated as a different server than the server 118, it is contemplated that the functionality of the training server 130 described below be executed by the server 118.

Generally speaking, the purpose of the training server 130 is to train one or more machine learning algorithms (MLAs) used by the search engine service 124 by generating a training set.

The training server 130 may, as an example, train one or more MLAs associated with the server 118 for improving general web searches, vertical web searches, providing recommendations, predicting outcomes, and other applications. The training and improvement of the MLAs may be executed at predetermined periods of time, or when deemed necessary by the search engine provider.

Training the MLA

Figure 3:
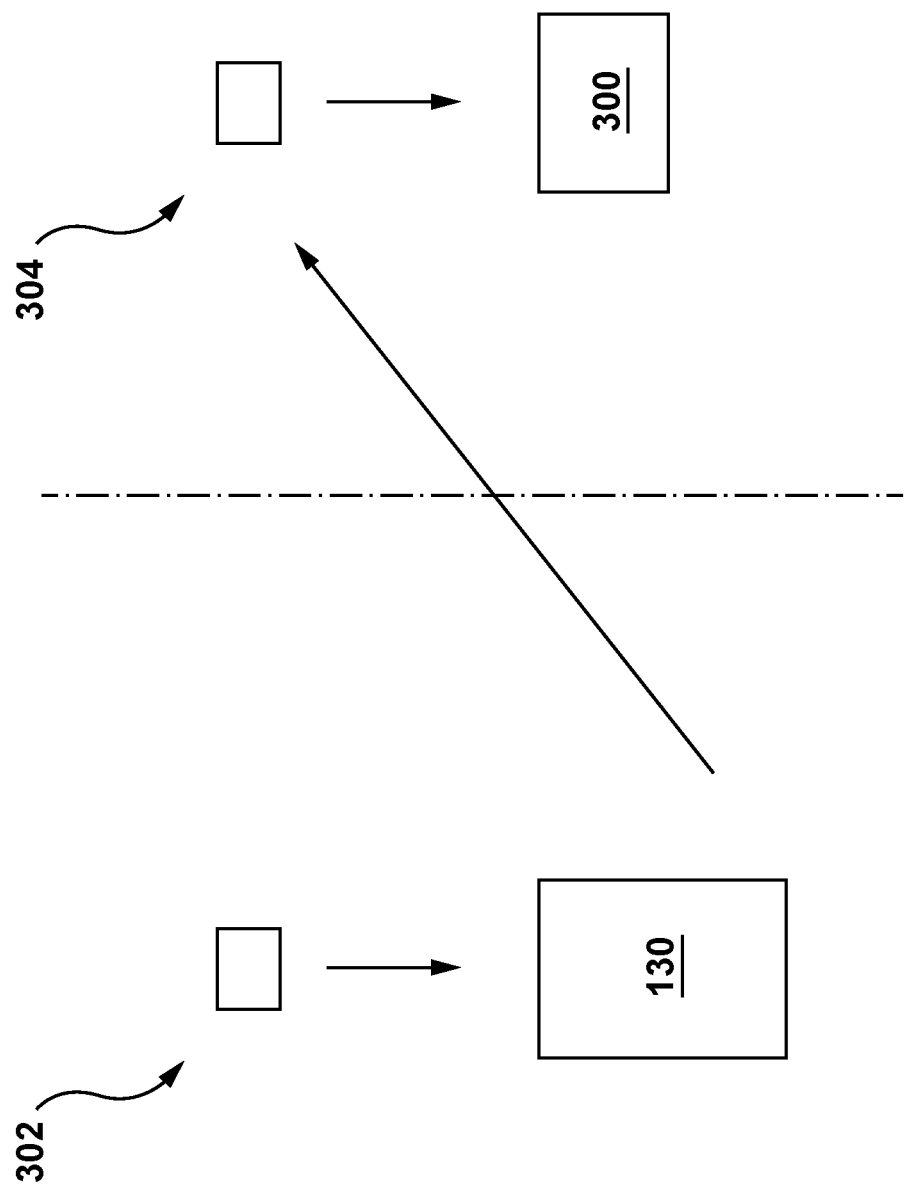
FIG. 3 depicts an example of a process for training a machine learning algorithm used by the system of FIG. 1.

With reference to FIG. 3, a schematic illustration of a process of training a MLA 300 is depicted. The MLA 300 is used by the search engine service 124.

For a better understanding of the underlying concepts of the present technology, it should be understood that the training of the MLA 300 can be broadly separated into a first phase and a second phase. In the first phase, the training input data 304 (discussed below) is generated. In the second phase, the MLA 300 is trained using the training input data 304. Moreover, although the steps of training the MLA 300 is explained as being executed by the training server 130, it is contemplated that the training of the MLA 300 is executed by another entity, such as the server 118.

In accordance with a non-limiting embodiment of the present technology, generating the training input data 304 begins with the training server 130 retrieving a data packet 302 by the log database 126. The data packet 302 comprises the query log 128 associated with the electronic device 102 (see FIG. 2). Needless to say, although only the query log 128 associated with the electronic device 102 is described to be retrieved by the training server 130, it should be understood that this is done merely for ease of explanation. It is contemplated that the data packet 302 comprises one or more query logs associated with other electronic devices (not shown), or in other words, query logs associated with searches of multiple users. In some non-limiting embodiment of the present technology, the training server 130 is configured to retrieve the query log 128 periodically, such as every day, week, and the like. In another non-limiting embodiment of the present technology, the training server 130 is configured to retrieve the one or more query logs that meet a predetermined criteria, such as for example, the query logs that include searches made within the past hour, past day, and the like.

In response to receiving the query log 128, the training server 130 is configured to identify one or more search sessions within the query log 128. In the context of the present technology the term "search session" refers to a period of time starting with a user starting a search (such as launching the search engine application 108) and terminating upon completing the search (such as closing the search engine application 108). In some non-limiting embodiment of the present technology, the search session is defined by a time period, such as 7 minutes. In other words, the one or more search queries submitted within a rolling period of 7 minutes together form a search session. It should be noted that the time period used can be varied in other non-limiting embodiments of the present technology (i.e. can be more or less than 7 minutes).

With reference to FIG. 2, the training server 130 has identified a search session 218, which comprises the first search query 202, the second search query 204, the third search query 206, the fourth search query 208 and the fifth search query 210 all submitted within a 7 minutes.

Returning to FIG. 3, having identified the search session 218, the training server 130 is further configured to select two search queries from the search session 218. Generally speaking, non-limiting embodiments of the present technology contemplate two to how to select the two search queries in accordance with the non-limiting embodiments of the present Refinement In some non-limiting embodiments of the present technology, the two search queries correspond to a search query and its refinement.

In some non-limiting embodiments of the present technology, where a plurality of search queries together form a chain of reformulations, the training server 130 is configured to select the latest one (i.e. the third search query 206 and the fifth search query 210) and the immediately preceding search query. In other words, the selection of the two search queries can be executed only in response to determining an overlap of a single common search term, or at least one common search term between two consecutive search queries. Put another way, in some non-limiting embodiments of the present technology, negative examples can be generated using any two search queries. In other non-limiting embodiments, the two queries are checked for an overlap in search query terms and are only used for negative example generation only in response to a pre-determined number of overlapping search terms, such as a single overlapping search term or at least two overlapping search terms. These various non-limiting embodiments are useful for balancing the similarity of the search queries (through checking for search terms overall) and ensuring that search results are sufficiently different (to make for good negative examples).

It should be understood that in the above example, the first query is broader, and the second query is narrower to better target the search since the first query presumably did not render satisfactory results. As such, the presence of a refinement within a search session is a signal indicating the presence of a negative example, as further described below.

Non-Refinement/Random

In some non-limiting embodiments of the present technology, the two search queries are selected randomly, or in other words, as non-chain reformulations. For example, the two search queries may include the fifth search query 210 ("pizza montreal takeout") with the third search query 206 ("103 rejection USPTO overcome").

It should be understood that in the above example, the two unrelated search queries and their respective search results can still be useful in generating negative training examples, as described below.

Having identified two search queries from the search session 218, the training server 130 is configured to analyze the associated SERP. Let us assume, for the purpose of explanation, that the two search queries correspond to the second search query 204 and the third search query 206.

Figure 4:
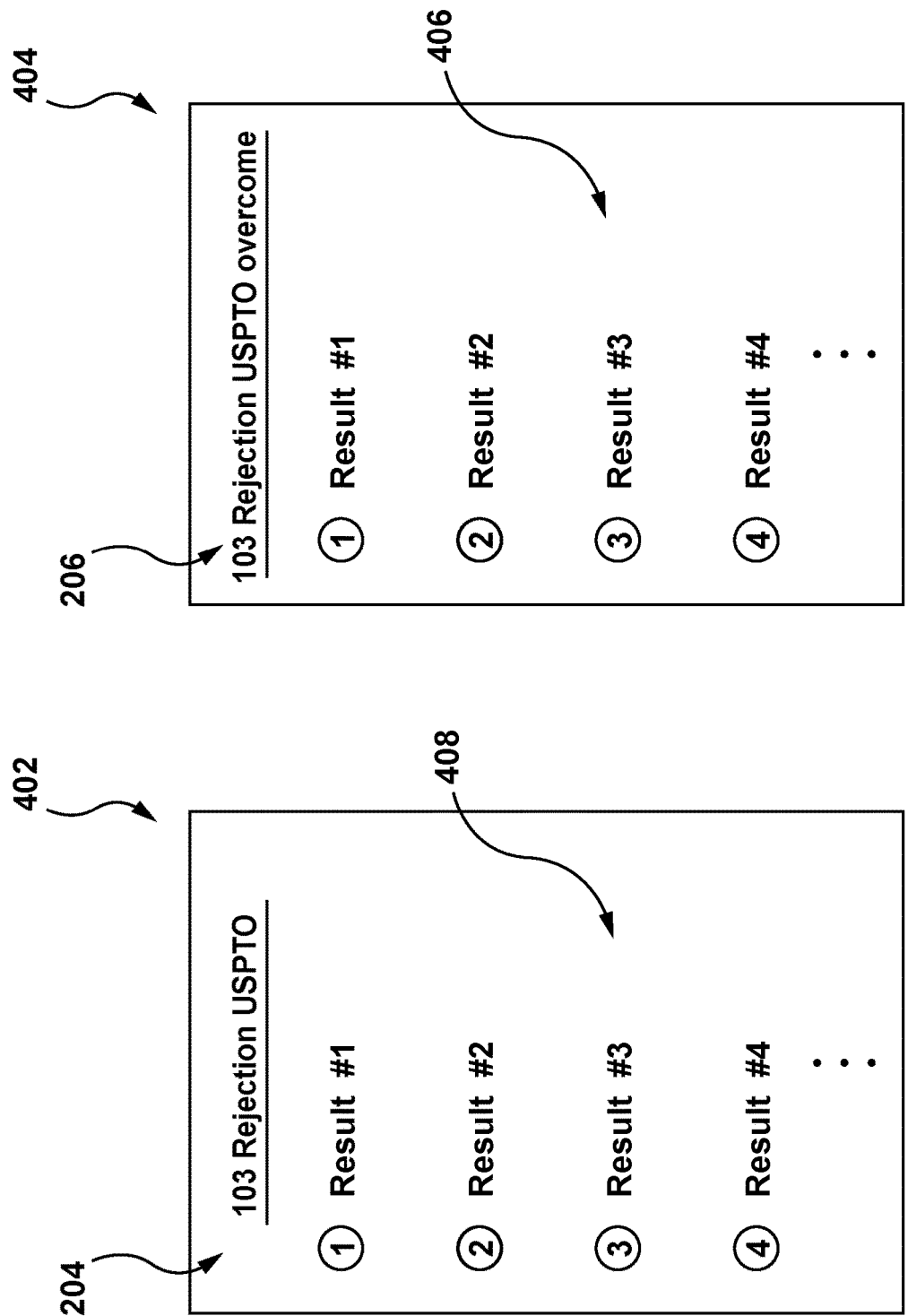
FIG. 4 depicts two search engine results page implemented in accordance with a non-limiting embodiment of the present technology.

With reference to FIG. 4, there is depicted a first SERP 402 of the second search query 204 and a second SERP 404 of the third search query 206 implemented in accordance with a non-limiting embodiment of the present technology.

In the illustrated example, each of the first SERP 402 and the second SERP 404 includes a respective set of search results (comprising four search results respectively). It should be understood that this is not limited and it is contemplated the each of the first SERP 402 and second SERP 404 include more or fewer than four search results. Moreover, the four search results are arranged in an order of relevancy (in a decreasing order).

The training server 130 is then configured to generate the training input data 304 (see FIG. 3). Generally speaking, the training input data 304 is a negative training example for training the MLA 300 in the second phase, and comprises the third search query 206 paired with one of the search results from the first SERP 402. As it will be illustrated below, the present technology comprises non-limiting embodiments on how to identify the search result from the first SERP 402 that is paired with the third search query 206.

In some non-limiting embodiments of the present technology, the training server 130 randomly selects a search result from the first SERP 402 to be paired with the third search query 206.

In yet another non-limiting embodiment of the present technology, the training server 130 is configured to select the search result from the first SERP 402 based on the user interaction parameter 216 associated with the third search query 206. More specifically, recalling that the query log 128 comprises the user interaction parameter 216 which is indicative of one or more types of interactions executed by the user of the electronic device 102 with each of the search queries, the training server 130 is configured to select the search result within the second SERP 404 that has received the most interactions.

Let us assume for example, that the user interaction parameter 216 of the third search query 206 is indicative that the user has interacted the most with a third search result 406 (by only clicking the third search result 406), which is positioned at a third position within the second SERP 404.

The training server 130 can then be configured to select a search result 408 which is positioned at the same position (i.e. third position) within the first SERP 402 to be paired with the third search query 206. In an alternative non-limiting embodiment, the training server 130 is configured to select a search result which is positioned at a random position within a predetermined distance from the same position (i.e. third place) within the first SERP 402 to be paired with the third search query 206. For example, the training server 130 is configured to randomly select the search result from the search results that are positioned one rank below, at the same position or above the third position within the first SERP 402 ("Result #2" and/or "Result #4") to be paired with the third search query 206.

105. In a non-limiting embodiment of the present technology, the training server 130 is configured to additionally check a user interaction parameter associated with the so-selected search result from the first SERP 402. More specifically, assuming that the search result 408 has been selected, the training server 130 is configured to determine if the user interaction parameter of the search result 408 is indicative that the user has a dwell time below a predetermined threshold, such as 30 seconds or any other suitable time interval. If the user interaction parameter is above the predetermined threshold, the training server 130 is configured to discard the search result 408 to be paired with the third search query 206 and moves on to check for other search results within the first SERP 402 (or other SERPs within the same search session or search sessions from other users) to be paired with the third search query 206. This is based on the assumption that even though the user executed a refinement, if the user has dwelled for more than 30 seconds for a particular search result, the search result contained some information that was considered pertinent to the user and hence should be discarded from the negative example generation.

Now, although the above explanation of the generating the negative training examples have been done with respect to two search queries that are reformulations/refinements (i.e. the second search query 204 and the third search query 206), it is not limited as such. Indeed, as discussed above, in addition to, or instead of the second search query 204 and the third search query 206, the training server 130 may be configured to generate one or more negative training examples from other pairs of search queries, such as for example, the fifth search query 210 and the first search query 202. Moreover, although the one or more negative training examples have been described as being are generated based on only a portion of the query log 128 associated with the electronic device 102, it should be understood that this is done for ease of explanation and it is contemplated that more negative training examples may be generated using one or more query logs associated with one or more electronic devices (other than the electronic device 102) as well as an updated version of the query log 128 as the electronic device 102 performs additional searches. It is also contemplated that to the extent that a given user may have had several search intents during a single search session, several negative examples can be generated using the simple search session, such as for example, one negative example per search intent used during the single search session.

The negative training examples generated for the search session 218 form the training input data 304. Needless to say, although there is only described a single instance of generating the negative training examples, it should be expressly understood that this done for ease of explanation and the training input data 304 would include more negative training examples generated from other search logs.

Although in the above description, the training input data 304 only comprises negative training examples, it is not limited as such. It is contemplated that the training server 130 generates one or more positive training examples. For example, recalling that the third search result 406 has been clicked by the user in response to the third search query 206, the training server 130 may generate a positive training example where the third search result 406 is paired with the third search query 206.

In some non-limiting embodiment of the present technology, in order to determine that the third search result 406 is to be used for the positive training example, the training server 130 is configured to determine if the third search result 406 has been viewed (or otherwise interacted with) for a predetermined amount of time prior to generating the positive training example where the third search result 406 is paired with the third search query 206. In some non-limiting embodiment of the present technology, the predetermined amount of time corresponds to 30 seconds. Needless to say, it is contemplated that the predetermined amount of time be more or less than 30 seconds.

In another non-limiting embodiment of the present technology, the training server 130 is configured to assign a ranking score to each search results within the second SERP 404. How the ranking score is implemented is not limited. For example, the ranking score may be binary, where the clicked search results that is a suitable candidate for positive training examples (such as the third search result 406) is assigned a ranked score of 1, and the unclicked search results (i.e. those potentially suitable for negative training examples) are assigned a ranked score of 0 (or vice-versa). In another example, the ranked score may be an integer score based on the length of the view of each or another type of interaction with the search results. More precisely, if the user has viewed the third search result 406 for 1300 seconds, then the ranked score may correspond to log (1300) (or 3.114). In some non-limiting embodiments, the view time may be capped to 10 minutes (i.e. 600 seconds), or any other value, such that if the user has viewed the third search result 406 for 1300 seconds, then the ranked score corresponds to log (600). On the other hand, search results that have not been viewed are given a ranked score of 0.

Having assigned a ranked score to each of the search results included within the second SERP 404, the training server 130 can be configured to pair the search result with a highest ranked score with the third search query 206 to generate a positive training example.

Returning to FIG. 3, how the MLA 300 is trained using the training input data 304 is now explained.

The training input data 304 is inputted into the MLA 300. The MLA 300 includes a training logic to determine a set of features associated with each negative training examples. How the MLA 300 is implemented is not limited. In some non-limiting embodiments of the present technology, the MLA 300 is implemented as a neural network.

More precisely, recalling that each of the training examples are negative training examples, the MLA 300 is configured to learn, what set of features is indicative of low relevancy of the search result to the search query.

Accordingly, the MLA 300 is configured to generate an inferred function, and when executed by the server 118 as part of the search engine service 124, which is configured to assign a ranking parameter to a given search result in response to a given search query received during the in-use phase, based on the set of features associated with the given search query and the given search result.

Needless to say, although there is depicted only a single instance of the training of the MLA 300, it is done so for ease of illustration. It should be expressly understood that the training of the MLA 300 is done iteratively using a plurality of both negative and positive training examples.

Figure 5:
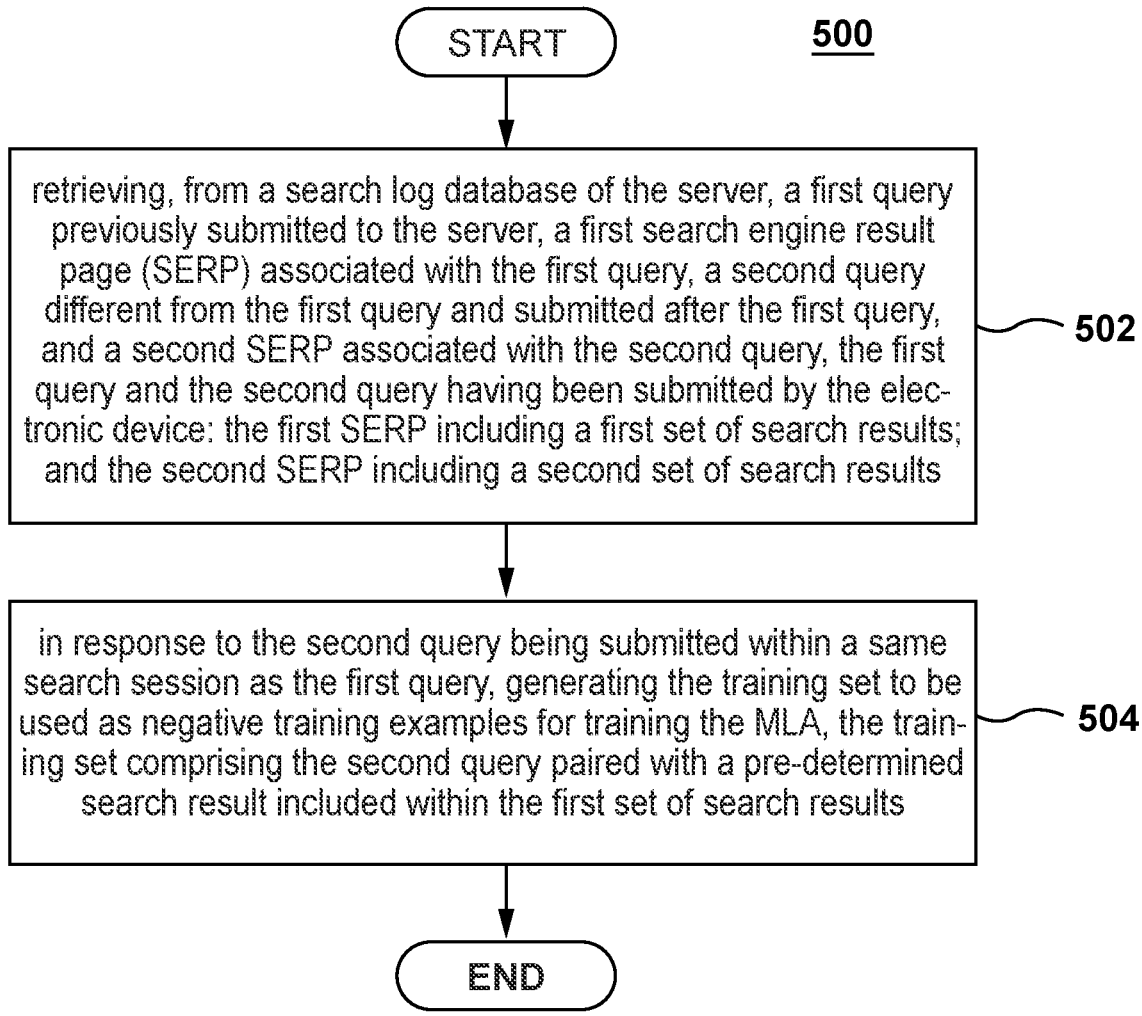
FIG. 5 depicts a schematic diagram of a process for generating training sets for a machine learning algorithm.

Given the architecture and examples provided hereinabove, it is possible to execute a computer-implemented method for providing a recommended content in response to determining an occurrence of a visit by a user to a venue. With reference to FIG. 5, there is depicted a flow chart of a method 500 for determining an occurrence of a visit by a user to a venue. The method 500 being executable in accordance with non-limiting embodiments of the present technology. The method 500 can be executed by the training server 130.

Step 502: retrieving, from a search log database of the server, a first query previously submitted to the server, a first search engine result page (SERP) associated with the first query, a second query different from the first query and submitted after the first query, and a second SERP associated with the second query, the first query and the second query having been submitted by the electronic device The method 500 starts at step 502, where the training server 130 retrieves the query log 128 of the electronic device 102 from the log database 126 via the data packet 302.

In the illustrated example of the query log 128 of the electronic device 102, it is shown that the electronic device 102 has submitted 5 queries (namely a first search query 202, a second search query 204, a third search query 206, a fourth search query 208 and a fifth search query 210). Each of the 5 queries is associated with a respective time stamp 212, a respective SERP 214 and a respective user interaction parameter 216. Needless to say, although the query log 128 of the electronic device 102 includes only 5 queries, it is not limited as such, and it is contemplated that the query log 128 includes more or less than 5 queries.

Step 504: in response to the second query being submitted within a same search session as the first query, generating the training set to be used as negative training examples for training the MLA, the training set comprising the second query paired with a pre-determined search result included within the first set of search results At step 504, the training server is configured to identify the search session 218.

Having determined the one or more search sessions within the query log 128, the training server 130 is further configured to select two search queries from the search session 218. For example, taking the search session 218 as an example, the training server 130 is configured to select the third search query 206 and one of the first search query 202 and the second search query 204 (which is immediately preceding the third search query 206).

Having identified two search queries from the search session 218 and the second search session 220, the training server 130 is configured to analyze the associated SERP.

Taking a look at FIG. 4, there is depicted a first SERP 402 of the second search query 204 and a second SERP 404 of the third search query 206 implemented in accordance with a non-limiting embodiment of the present technology.

In the illustrated example, each of the first SERP 402 and the second SERP 404 includes a respective set of search results (comprising four search results respectively). It should be understood that this is not limited and it is contemplated the each of the first SERP 402 and second SERP 404 include more or less than four search results. Moreover, the four search results are arranged in an order of relevancy (in decreasing order).

The training server 130 is then configured to generate the training input data 304. Generally speaking, the training input data 304 is a negative training example for training the MLA 300 in the second phase, and comprises the third search query 206 paired with one of the search results from the first SERP 402.

The method 500 then terminates or returns to step 502 with a new query log.

It should be apparent to those skilled in the art that at least some embodiments of the present technology aim to expand a range of technical solutions for addressing a particular technical problem encountered by the conventional method of determining the occurrence of a visit to a venue by a user.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A computer-implemented method for generating a training set for training a machine learning algorithm (MLA) implemented in an information retrieval system, the MLA executable by at least one server, the at least one server being configured to be accessed by an electronic device, the method executable by the at least one server, the method comprising:
retrieving, from a search log database of the at least one server, a first query previously submitted to the server, a first search engine result page (SERP) associated with the first query, a second query different from the first query and submitted after the first query, and a second SERP associated with the second query, the first query and the second query having been submitted by the electronic device, wherein the first SERP includes a first set of search results, and wherein the second SERP includes a second set of search results; and
in response to the second query being submitted within a same search session as the first query, generating the training set to be used as a negative training example for training the MLA, the training set comprising the second query paired with a pre-determined search result included within the first set of search results.

2. The computer-implemented method of claim 1, wherein the method further comprises, prior to generating the training set, checking if the first query and the second query were submitted to the server by the electronic device within the same search session.

3. The computer-implemented method of claim 2, wherein determining that the first query and the second query were submitted within the same search session comprises analyzing a time difference between a first time at which the first query was submitted and a second time at which the second query was submitted.

4. The computer-implemented method of claim 3, wherein in response to the time difference being below a pre-determined time threshold, the first query and the second query are determined to have been submitted within the same search session.

5. The computer-implemented method of claim 3, wherein determining that the first query and the second query were submitted within the same search further comprises analyzing the first query and the second query.

6. The computer-implemented method of claim 5, wherein the method further comprises analyzing the first query and the second query to identify an overlap between the first query and the second query, and wherein the generating the training set is only executed in response to identifying that there is the overlap.

7. The computer-implemented method of claim 6, wherein identifying the overlap comprises determining that there is at least one common search term between the first query and the second query.

8. The computer-implemented method of claim 6, wherein the identifying the overlap comprises determining that there is a single common search term between the first query and the second query.

9. The computer-implemented method of claim 1, further comprising:
retrieving, from the search log database of the at least one server, a set of user interaction parameters being indicative of one or more type of interaction executed by a user of the electronic device with the second SERP for a given search result included within the second set of search results, the set of user interaction parameters comprising at least one of:
a hovering time for the given search result; or
a click event for the given search result.

10. The computer-implemented method of claim 9, further comprising:
selecting a search result included within the second set of search results having a highest user interaction parameter; and
selecting the pre-determined search result based on a position of the search result within the second SERP.

11. The computer-implemented method of claim 10, wherein the pre-determined search result corresponds to at least one of:
a first given search result having a same position within the first SERP as the search result within the second SERP; or
a second given search result having a position above or below the position of the search result within the first SERP.

12. The computer-implemented method of claim 11, further comprising randomly selecting the pre-determined search result as one of the first given search result having the same position within the first SERP as the search result within the second SERP or the second given search result having the position above or below the position of the search result within the first SERP.

13. The computer-implemented method of claim 1, wherein the method further comprises analyzing user interaction with the pre-determined search result, and wherein the generating the training set is only executed in response to the user interaction with the pre-determined search result being below a pre-determined interaction threshold.

14. The computer-implemented method of claim 13, wherein the pre-determined interaction threshold is thirty seconds.

15. The computer-implemented method of claim 1, wherein the search session comprises a plurality of SERPs generated in response to a plurality of queries, the plurality of SERPs including the first SERP and the second SERP and the plurality of queries including the first query and the second query, and wherein the second SERP is a last SERP of the plurality of SERPs.

16. The computer-implemented method of claim 15, wherein the first SERP is an immediately preceding SERP for the second SERP within the plurality of SERPs.

17. A system for generating a training set for training a machine learning algorithm (MLA) executable by at least one server, the at least one server being accessible by an electronic device, the at least one server comprising at least one processor configured to:
retrieve, from a search log database of the at least one server, a first query previously submitted to the server, a first search engine result page (SERP) associated with the first query, a second query different from the first query and submitted after the first query, and a second SERP associated with the second query, the first query and the second query having been submitted by the electronic device, wherein the first SERP includes a first set of search results, and wherein the second SERP includes a second set of search results; and
in response to the second query being submitted within a same search session as the first query, generate the training set to be used as a negative training example for training the MLA, the training set comprising the second query paired with a pre-determined search result included within the first set of search results.

18. The system of claim 17, wherein prior to generating the training set, the at least one processor is configured to check if the first query and the second query have been submitted to the server by the electronic device within the same search session.

19. The system of claim 18, wherein to determine if the first query and the second query have been submitted within the same search session, the at least one processor is configured to analyze a time difference between a first time at which the first query was submitted and a second time at which the second query was submitted.

20. The system of claim 19, wherein in response to the time difference being below a pre-determined time threshold, the at least one processor is configured to determine that the first query and the second query were submitted within the same search session.

* * * * *